United States Patent
Reusche et al.

(10) Patent No.: US 7,096,898 B2
(45) Date of Patent: Aug. 29, 2006

(54) SYSTEM AND METHOD FOR AUTOMATICALLY FILLING A LIQUID RECEPTACLE

(75) Inventors: Thomas K. Reusche, Elbum, IL (US); Philip E. Chumbley, Aurora, IL (US)

(73) Assignee: Allied Precision Industries, Inc., Elburn, IL (US)

( * ) Notice: Subject to any disclaimer, the term of this patent is extended or adjusted under 35 U.S.C. 154(b) by 57 days.

(21) Appl. No.: 10/984,125

(22) Filed: Nov. 8, 2004

(65) Prior Publication Data

US 2006/0096658 A1    May 11, 2006

(51) Int. Cl.
*B65B 1/04* (2006.01)
(52) U.S. Cl. ............................ 141/198; 4/508; 119/69.5
(58) Field of Classification Search ............... 141/95, 141/198; 4/368–376, 508; 137/426, 410; 119/69.5
See application file for complete search history.

(56) References Cited

U.S. PATENT DOCUMENTS

| | | | | | |
|---|---|---|---|---|---|
| 3,024,799 | A | * | 3/1962 | Flieder | 137/207 |
| 3,908,206 | A | * | 9/1975 | Grewing | 4/508 |
| 5,301,375 | A | * | 4/1994 | Osmond | 4/368 |
| 5,743,212 | A | * | 4/1998 | Forjohn | 119/69.5 |
| 5,790,991 | A | * | 8/1998 | Johnson | 4/508 |
| 6,647,922 | B1 | * | 11/2003 | Travis | 119/69.5 |

* cited by examiner

*Primary Examiner*—Steven O. Douglas
(74) *Attorney, Agent, or Firm*—McAndrews, Held & Malloy

(57) ABSTRACT

An automatic liquid filling system including a liquid supply, a liquid-retaining structure, and a filling apparatus in fluid communication with the liquid supply and the liquid-retaining structure. The filling apparatus is configured to automatically supply liquid to the liquid-retaining structure when the liquid recedes below a low level that is based on a position of the filling apparatus in relation to the liquid-retaining structure.

18 Claims, 3 Drawing Sheets

SYSTEM AND METHOD FOR AUTOMATICALLY FILLING A LIQUID RECEPTACLE

BACKGROUND OF THE INVENTION

Embodiments of the present invention generally relate to a system and method of filling a liquid receptacle, and more particularly to a system and method of automatically filling a liquid-retaining structure, such as a bird bath.

Various liquid-retaining structures, such as bird baths, pet water bowls, livestock troughs, aquariums, pools, and the like require a minimal amount of liquid to adequately operate. For example, if the water level in a bird bath is too low, birds will not be attracted to the bird bath. Similarly, a livestock water trough will be incapable of providing water to livestock if the trough is empty.

In order to maintain suitable water levels within liquid-retaining structures, a user typically monitors the liquid levels within the structures. When the liquid level within a structure is too low, the user typically refills the structure. The water level within the structure remains low or empty until the user decides to refill the structure. As such, if the user is absent for a given period of time, the liquid-retaining structure will remain low or empty until the user returns and refills the structure.

Thus, a need exists for a safe, efficient, cost-effective manner of automatically filling a water-retaining structure, such as a bird bath, pool, pond, livestock water trough, aquarium, or the like.

SUMMARY OF THE INVENTION

Embodiments of the present invention provide an automatic liquid filling system that includes a liquid supply, a liquid-retaining structure configured to receive and retain liquid, and a filling apparatus in fluid communication, e.g., by way of garden hoses, with the liquid supply and the liquid-retaining structure. The filling apparatus is configured to automatically supply liquid to the liquid-retaining structure when the liquid recedes below a low level that is based on a position, e.g., the height, of the filling apparatus in relation to the liquid-retaining structure. In general, the liquid levels within the filling apparatus and the liquid-retaining structure are equal due to ambient air pressure.

The system may also include a support structure. The filling apparatus is supported on the support structure, and the low level is based on a vertical position of the filling apparatus on the support structure.

The liquid-retaining structure may be a basin of a birdbath, a livestock water trough, a pet water receptacle, an aquarium, a pool, or various other structures that receive and retain a liquid.

The filling apparatus may include a liquid reservoir having lateral walls integrally formed with a base defining a liquid-retaining cavity therebetween. A liquid inlet and outlet are formed through the base. An inlet valve tube connects to the liquid inlet, and is configured to receive liquid through the liquid inlet. A lever is positioned on the inlet valve tube, and is configured to selectively open and close the inlet valve tube such that liquid is prevented from passing through the inlet valve tube when the inlet valve tube is closed. A buoyant member is positioned within the liquid-retaining cavity and is configured to float within the liquid-retaining cavity. A translation member is operatively connected to the buoyant member and the lever. The buoyant member is adapted to actuate the lever to open the inlet valve tube by exerting a force on the translation member when the buoyant member is below a certain level.

A mounting bracket may be secured to the liquid reservoir, and may movably engage a support structure so that the liquid reservoir may be adjusted to various levels.

The system may also include a bubble suppression device in fluid communication with, and disposed between, the liquid-retaining structure and the filling apparatus. The bubble suppression device includes a main body with a fluid inlet, liquid outlet, and air outlet formed therein. The bubble suppression device is configured to separate entrained air bubbles from the water.

Embodiments of the present invention also provide a method of operating an automatic-liquid filling system. The method includes positioning a filling apparatus on a support structure, adjusting the filling apparatus on the support structure to a desired liquid level position that corresponds to a liquid-retaining structure, connecting the filling apparatus of a liquid supply and the liquid-retaining structure, activating a filling activator within a liquid reservoir of the filling apparatus to begin filling a liquid reservoir of the filling apparatus with liquid, drawing liquid from the liquid reservoir into the liquid-retaining structure, and automatically providing liquid to the liquid-retaining structure from the liquid reservoir when liquid retained in the liquid-retaining structure recedes below the desired liquid level position.

The automatically providing liquid to the liquid-retaining structure step may include exerting a force on the filling activator with an operatively connected float that recedes with a level of the liquid within the reservoir. The exertion of force opens a valve that is operatively connected to the filling activator thereby passing liquid from the liquid supply into the liquid reservoir. The method may also include deactivating the filling activator by closing the valve when the float rises to a deactivating level within the water reservoir.

Figure 1:
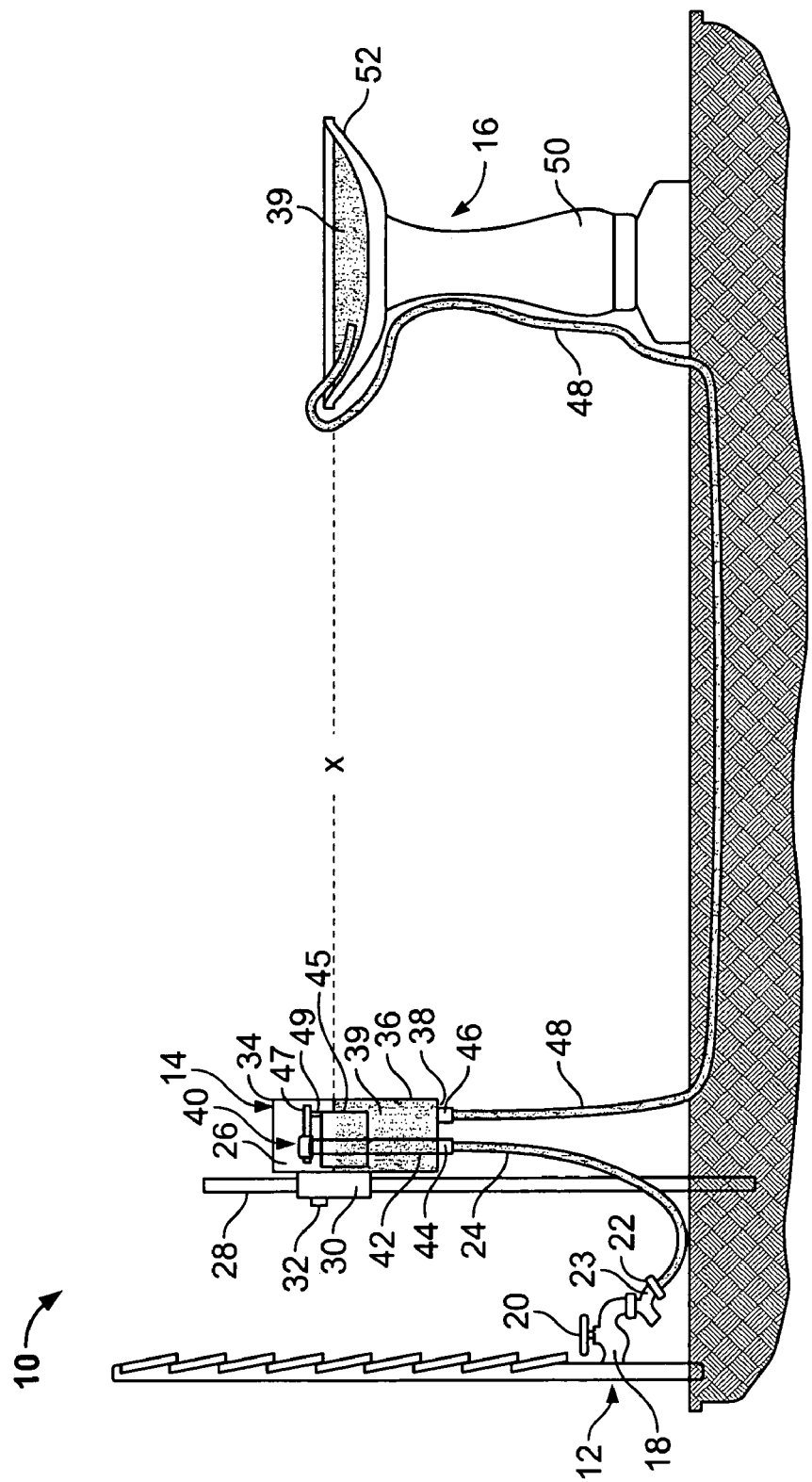
FIG. 1 illustrates an automatic liquid-filling system, according to an embodiment of the present invention.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DETAILED DESCRIPTION OF THE INVENTION

FIG. 1 illustrates an automatic liquid-filling system 10, according to an embodiment of the present invention. The system 10 includes a water supply 12, a filling apparatus 14, and a water-retaining structure, such as a bird bath 16.

The water supply 12 may be an ordinary faucet 18 having an opening valve 20 and a water outlet 22. The faucet 18 is in fluid communication with a water supply system (not shown). The faucet 18 may be the type commonly found on various residential homes. The faucet 18 is fluidly connected to the filling apparatus 14 through a hose 24 that is connected to the water outlet 22. A dual-outlet Y connector 23 may be disposed between the water outlet 22 and the hose 24. Thus, the faucet 18 may still be used for various other applications.

The filling apparatus 14 includes a water reservoir 26 mounted to a support structure 28, such as a pole, rail, column, or another such upwardly standing structure, through a bracket 30. The bracket 30 includes a support structure channel (not shown) that is configured to allow the bracket 30, and therefore the water reservoir 26, to slide or otherwise move over the surface of the support structure 28. The bracket 30 also includes a fastener 32 that is configured to engage the support structure 28 so that the water reservoir 26 may be secured at a desired position.

The water reservoir 26 includes a main body 34 defined by lateral walls 36 integrally formed with a base 38. The water reservoir 26 is configured to receive and retain water 39 within a fluid-retaining cavity 40 that is defined between the lateral walls 36 and the base 38. An inlet valve tube 42 extends through the base 38 and into the fluid retaining cavity 40. The inlet tube 42 includes a water inlet 44 that is fluidly connected to the hose 24. The inlet valve tube 42 may be configured to allow water to pass therethrough until a desired water level is reached. Once the desired water level is reached, the inlet valve tube 42 closes, thereby preventing additional water from passing therethrough. Thus, the water reservoir 26 may receive and retain the water 39 from the water supply 12 through the hose 24.

A float 45 is slidably positioned over the inlet valve tube 42 and is operatively connected to an lever 47 positioned on top of the inlet valve tube 42 through a translation member 49, such as a chain, beam, or other such structure that is capable of connecting the level to the float 45. Optionally, the float 45 may simply be positioned within fluid-retaining cavity 40, but not be positioned over the inlet valve tube 42. The float 45 may be formed of various types of buoyant material, such as Styrofoam, rubber, an air-filled structure, or the like. The lever 47 is operatively connected to the inlet valve tube 42, so that the lever 47 may selectively open and close the inlet valve tube 42.

A water outlet 46 is also formed through the base 38 of the water reservoir 26, and allows water to pass out of the cavity 40. The water outlet 46 is fluidly-connected to a hose 48 and acts as a fluid conduit from the water reservoir 26 to the bird bath 16. A portion of the hose 48 may be positioned underground.

The birdbath 16 includes a pedestal 50 that supports a water-retaining basin 52. A water outlet 54 of the hose 48 is positioned within the basin 52 to allow water to pass from the hose 48 into the basin 52. The hose 48 may be secured to the pedestal 48 and basin 52 through various fasteners, such as clips, ties, and the like. While the system 10 is shown with a birdbath 16, the system 10 may also be used with various water retaining structures, such as aquariums, ponds, pools, and the like.

In operation, the water reservoir 26 is set to a desired water level height, which corresponds to a desired liquid level within the basin 52. Once the water reservoir 26 is set at a desired height, the activation lever 47 is depressed, thereby opening the inlet valve tube 42 50 that water 39 may be supplied to the water reservoir 26. Water 39 continues to pass into the water reservoir 26 until the float 45 floats to a position at which the lever 47 reaches a closing position. At the closing position, the lever 47 closes the inlet valve tube 42, thereby preventing additional water from entering the water reservoir 26.

The water 39 passes out of water outlet 46, through the hose 48, and into the basin 52. The water 39 continues into the basin 52 until the lever 47 reaches the closing position. The water level x within the basin 52 is the same as that within the water reservoir 26 because the hose 48 remains filled with water. As such, the water level x within the basin 52 and the reservoir 26 will be equal due to the ambient air pressure exerted on the water 39 within the basin 52 and the water reservoir 26.

Water 39 within the basin 52 may recede for various reasons, including evaporation, activity within the basin, wind, and the like. As the water level x within the basin 52 recedes, so to does the water level x within the water reservoir 26. As the water level x within the reservoir 52 recedes, the float 45 recedes with the water level x. The downward movement of the float 45 exerts a downward force on the translation member 49, which in turn exerts a downward force on a distal end of the lever 47. When the float 45 reaches a valve opening level, the downward force exerted on the distal end of the lever 47 acts to open the inlet valve tube 42, thereby allowing additional water to enter the reservoir 26. Additional water is then supplied to the basin 52. As additional water is supplied to the water reservoir 26, and therefore the basin 52, the water level within the basin 52 and the water reservoir 26 rise. As the water level x rises, the float 45 also rises. Water continues to be supplied to the water reservoir 26 until the distal end of the lever 47 is urged upward into a closed position by the float 45 through the translation member 49. When the lever 47 is in the closed position, the inlet valve tube 42 is closed, thereby preventing additional water from passing into the water reservoir 26. Thus, the bird bath 16 may be automatically filled and maintain a desired water level without the use of electricity, batteries, timers and the like.

Figure 2:
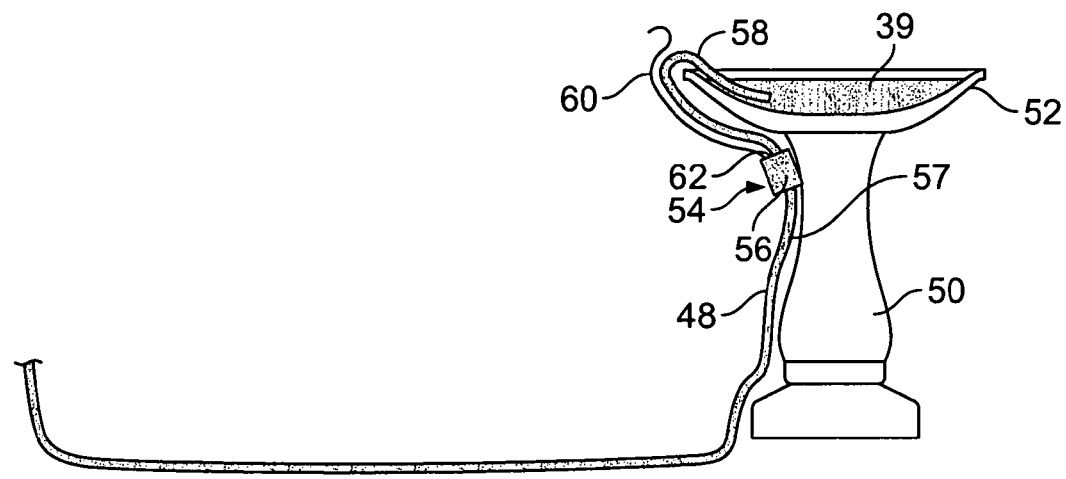
FIG. 2 illustrates a bubble-suppression device, according to an embodiment of the present invention.

FIG. 2 illustrates a bubble-suppression device 54, according to an embodiment of the present invention. An inlet end 56 of the bubble-suppression device 54 is connected to an outlet end 57 of the hose 48. A liquid outlet hose 58 and an air outlet hose 60 are connected, or extend from, an outlet end 62 of the device 54.

Figure 3:
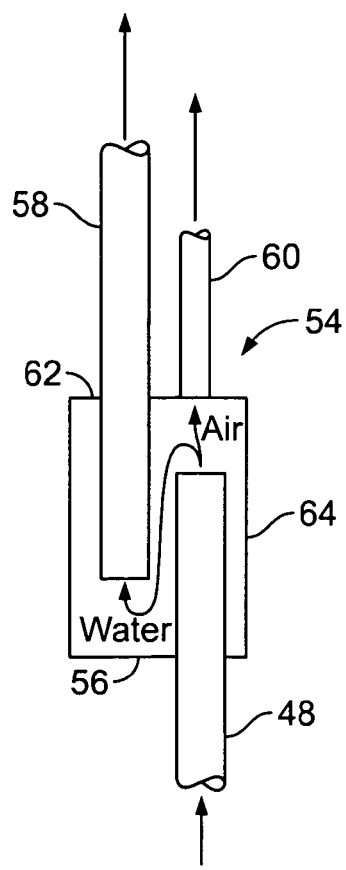
FIG. 3 illustrates a simplified representation of a bubble suppression device, according to an embodiment of the present invention.

FIG. 3 illustrates a simplified representation of the bubble suppression device 54. Water enters a main housing 64 of the bubble suppression device 54 through the hose 48. Any air bubbles entrained within the water supply rise to the upper portion of the main housing 64 and exit through the air outlet hose 60. Water is then passed through the main housing 64 into the liquid outlet hose 58. As such, the water supply within the liquid outlet hose 58 is free of any air. Thus, the bubble suppression device 54 acts to remove air bubbles from the water.

Figure 4:
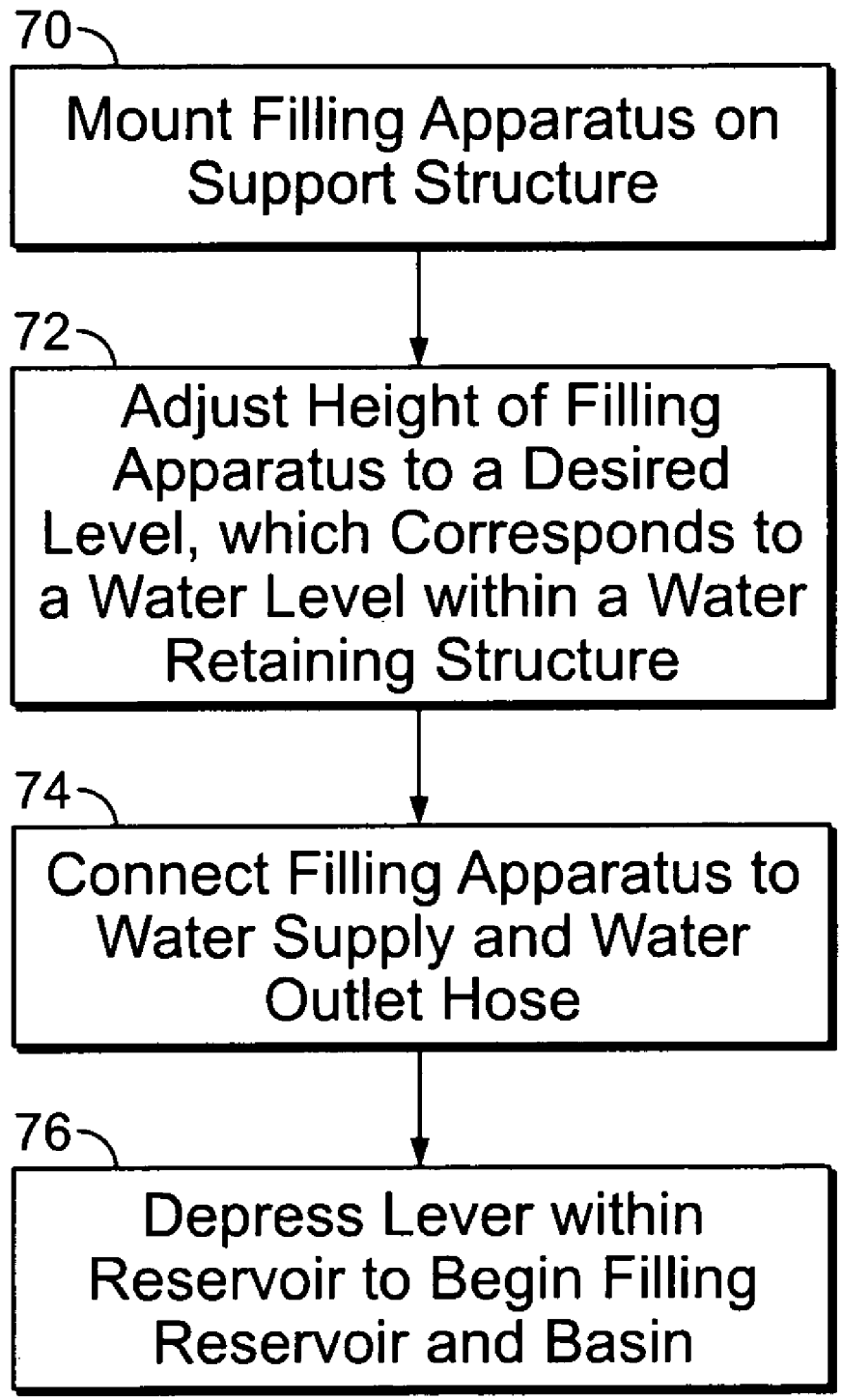
FIG. 4 illustrates a flow chart of a method of installing an automatic liquid-filling system, according to an embodiment of the present invention.

FIG. 4 illustrates a flow chart of a method of installing an automatic liquid-filling system, according to an embodiment of the present invention. First, at 70, the water filling apparatus 14 is mounted on a support structure, such as a pole. Next, at 72, the height of the filling apparatus 14 on the support structure is adjusted to a desired level. That is, the filling apparatus 14 is secured at a level that corresponds to the desired water level within the basin 52 of the bird bath 16. At 74, the filling apparatus is connected to the water supply 12, and the hose 48. The lever 47 within the water reservoir 26 is depressed to open the inlet valve tube 42, so that the water reservoir 26 may be filled with water at 76. Consequently, the inlet valve tube 42 will remain open until the desired water level is reached within the basin 52, as discussed above. The height of the filling apparatus 14 may be adjusted in order to vary the water level within the basin 52.

Embodiments of the present invention provide a safe, efficient, cost-effective manner of automatically filling a water-retaining structure, such as a bird bath, pool, pond, aquarium, or the like. Further, embodiments of the present invention ensure that the water-retaining structure maintains a desired water level.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A filling apparatus for automatically filling a bird bath, comprising:
    a water reservoir having lateral walls integrally formed with a base defining a water-retaining cavity therebetween; wherein a water inlet and outlet are formed through said base;
    an inlet valve tube connected to said water inlet, wherein said inlet valve tube is configured to receive water through said water inlet;
    a lever positioned on said inlet valve tube, said lever configured to selectively open and close said inlet valve tube, wherein water is prevented from passing through said inlet valve tube when said inlet valve tube is closed;
    a buoyant member positioned within said water-retaining cavity, said buoyant member configured to float within said water-retaining cavity;
    a translation member operatively connected to said buoyant member and said lever, wherein said buoyant member is configured to actuate said lever to open said inlet valve tube by exerting a force on said translation member when said buoyant member is below a certain level; and
    a mounting bracket secured to said water reservoir, wherein said mounting bracket is configured to movably engage a support structure so that said water reservoir may be adjusted to various levels.

2. The apparatus of claim 1, further comprising an inlet hose connected to said water inlet, wherein said inlet hose is also connected to a water supply; and an outlet hose connected to said water outlet, wherein said outlet hose is configured to pass water into a birdbath.

3. The apparatus of claim 1, wherein a level of water within a birdbath connected to said water reservoir is the same as the level of water within said water-retaining cavity.

4. The apparatus of claim 1, further comprising a bubble suppression device having a main body with a fluid inlet, liquid outlet, and air outlet formed therein, wherein said bubble suppression device is configured to separate entrained air bubbles from the water.

5. An automatic liquid filling system configured for use with a liquid supply and a liquid-retaining structure, comprising:
    a filling apparatus configured to be in fluid communication with the liquid supply and the liquid retaining-structure, said filling apparatus configured to automatically supply liquid to the liquid-retaining structure when the liquid recedes below a low level that is based on a position of said filling apparatus in relation to the liquid-retaining structure; and
    a bubble suppression device in fluid communication with, and disposed between, the liquid-retaining structure and said filling apparatus, said bubble suppression device having a main body with a fluid inlet, liquid outlet, and air outlet formed therein, wherein said bubble suppression device is configured to separate entrained air bubbles from the water.

6. The automatic liquid filling system of claim 5, further comprising a support structure, said filling apparatus being supported on said support structure, wherein the low level is based on a vertical position of said filling apparatus on said support structure.

7. The automatic liquid filling system of claim 5, wherein the liquid-retaining structure is a basin of a birdbath.

8. The automatic liquid filling system of claim 5, wherein said filling apparatus is in fluid communication with the liquid supply and the liquid retaining structure through hoses.

9. The automatic liquid filling system of claim 5, wherein said filling apparatus comprises:
    a liquid reservoir having lateral walls integrally formed with a base defining a liquid-retaining cavity therebetween; wherein a water inlet and outlet are formed through said base;
    an inlet valve tube connected to said liquid inlet, wherein said inlet valve tube is configured to receive liquid through said liquid inlet;
    a lever positioned on said inlet valve tube, said lever configured to selectively open and close said inlet valve tube, wherein liquid is prevented from passing through said inlet valve tube when said inlet valve tube is closed;
    a buoyant member positioned within said liquid-retaining cavity, said buoyant member configured to float within said liquid-retaining cavity;
    a translation member operatively connected to said buoyant member and said lever, wherein said buoyant member is configured to actuate said lever to open said inlet valve tube by exerting a force on said translation member when said buoyant member is below a certain level; and
    a mounting bracket secured to said liquid reservoir, wherein said mounting bracket is configured to movably engage a support structure so that said liquid reservoir may be adjusted to various levels.

10. The automatic liquid filling system of claim 9, further comprising an inlet hose connected to said water inlet, wherein said inlet hose is also connected to a water supply; and an outlet hose connected to said water outlet, wherein said outlet hose is configured to pass water into the liquid-retaining structure.

11. The automatic liquid filling system of claim 9, wherein a level of water within the liquid-retaining structure connected to said water reservoir is the same as the level of water within said water-retaining cavity.

12. A method of operating an automatic-liquid filling system, comprising:
    positioning a filling apparatus on a support structure;
    adjusting the filling apparatus on the support structure to a desired liquid level position that corresponds to a liquid-retaining structure;
    connecting the filling apparatus of a liquid supply and the liquid-retaining structure;
    activating a filling activator within a liquid reservoir of the filling apparatus to begin filling a liquid reservoir of the filling apparatus with liquid;
    drawing liquid from the liquid reservoir into the liquid-retaining structure;
    automatically providing liquid to the liquid-retaining structure from the liquid reservoir when liquid retained in the liquid-retaining structure recedes below the desired liquid level position; and separating entrained air bubbles from the liquid.

13. The method of claim 12, wherein the liquid-retaining structure is a basin of a bird bath.

14. The method of claim 12, wherein the liquid-retaining structure is one of a livestock water trough, an aquarium, a pet water receptacle, and a pool.

15. The method of claim 12, wherein said adjusting comprises adjusting the height of the filling apparatus on the support structure.

16. The method of claim 12, wherein said automatically providing liquid to the liquid-retaining structure comprises exerting a force on the filling activator with an operatively connected float that recedes with a level of the liquid within the reservoir.

17. The method of claim 16, wherein said exerting a force opens a valve that is operatively connected to the filling activator thereby passing liquid from the liquid supply into the liquid reservoir.

18. The method of claim 17, further comprising deactivating the filling activator by closing the valve when the float rises to a deactivating level within the water reservoir.

* * * * *